April 2, 1946.  A. L. BOWMAN  2,397,834
ROCKET MOTOR
Filed June 8, 1942
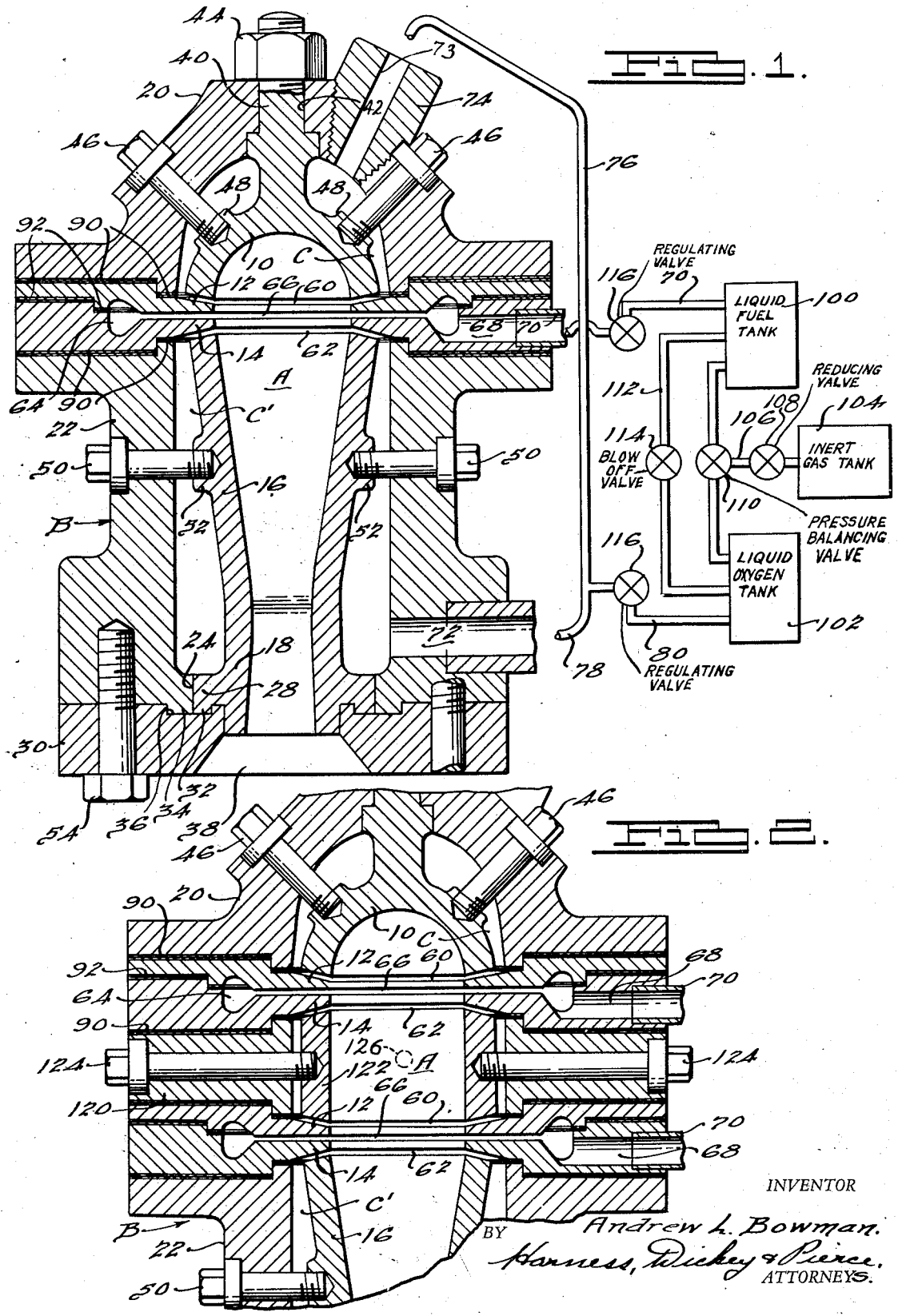

Patented Apr. 2, 1946

2,397,834

UNITED STATES PATENT OFFICE 2,397,834

ROCKET MOTOR

Andrew L. Bowman, Detroit, Mich., Mabel J. Bowman, Detroit, Mich., administratrix of said Andrew L. Bowman, deceased, assignor of one-half to Mabel J. Bowman and one-half to William Bowman Application June 8, 1942, Serial No. 446,319

10 Claims. (Cl. 60—35.6)

The invention relates to rocket motors and the principal object is the provision of a rocket motor of simplified construction and capable of operation with continuous combustion.

Objects of the invention include the provision of a rocket motor so constructed and arranged as to permit sufficient cooling of the combustion chamber forming parts thereof to permit operation with continued combustion without destruction; the provision of a rocket motor in which the combustion chamber forming parts thereof are adapted to be surrounded by a cooling medium which in turn provides the medium for supporting the combustion of fuel in the combustion chamber; the provision of a rocket motor in which the fuel which is being introduced into the combustion chamber is enveloped by a layer of combustion supporting media therefor; and the provision of a rocket motor in which the fuel and the combustion supporting media therefor are introduced into the combustion chamber through circular ports circumscribing the combustion chamber.

Other objects of the invention include the provision of a rocket motor that is simple in construction and capable of being readily and accurately manufactured by conventional machine shop methods; the provision of a rocket motor providing means for readily varying the size of the ports for the fuel and its combustion supporting media whereby to enable the volume and relative proportions of volumes of the fuel and of the combustion supporting media therefor to be readily and accurately varied; the provision of a rocket motor in which the combustion chamber forming parts are supported within an exterior housing arranged in generally spaced relation with respect thereto; the provision of a construction as above described in which the fuel is introduced into the combustion chamber through members forming portions of both the exterior housing and of the combustion chamber; the provision of a construction as above described in which each fuel introducing element comprises a pair of separable parts the relative spacings of which may be varied to vary the size of the fuel ports leading into the combustion chamber; the provision of a construction as above described in which those parts of the exterior housing associated with a fuel introduction unit or units may be varied with respect to such unit or units to vary the size of the ports through which the combustion supporting media for the fuel is introduced into the combustion chamber; and the provision of a construction as above described in which the various parts are of relatively simple construction and are capable of being rigidly located with respect to each other.

The above being among the objects of the present invention, the same consists in certain novel features of construction and combinations of parts to be hereinafter described with reference to the accompanying drawing, and then claimed, having the above and other objects in view.

In the accompanying drawing which illustrates suitable embodiments of the present invention:

Fig. 1 is a sectional view taken axially through a rocket motor having a single fuel inlet passage and illustrating more or less diagrammatically the means for supplying the fuel and the combustion supporting media for the fuel to the motor; and Fig. 2 is a fragmentary sectional view taken axially through a rocket motor embodying a pair of fuel inlet passages to a combustion chamber.

In the past, continuing explosion rocket motors have had little success primarily due to the fact that such provisions that have been made to maintain the temperature of the parts below their melting points have been insufficient, with the result that such motors have burned up in a relatively short time. It is the primary object of the present invention to provide a continuing combustion or explosion type of rocket that is capable of continued operation and yet is of an extremely simple design involving readily machinable parts and capable of being readily adjusted to vary the proportion of fuel and combustion supporting media for the fuel and relative volume of each fed to the motor.

Referring now to the accompanying drawing and particularly to Fig. 1, which shows a section of my improved rocket motor taken centrally therethrough, it will be understood that all of the parts shown are of circular section when viewed in a plane perpendicular to the plane of the drawing. The rocket motor shown comprises a combustion chamber unit indicated generally at A and a generally spaced and surrounding housing unit indicated generally at B. The combustion chamber unit A comprises a hollow semi-spherical head portion 10 followed by a pair of parts 12 and 14 which also form a part of the housing unit and which cooperate with each other to form a fuel inlet port, and which in turn are followed by a tapered or conical combustion chamber part 16, the lower end of which (as viewed in Fig. 1) is shaped to form a Venturi-like discharge nozzle 18. All of the parts thus far described are, of course, arranged in axially concentric relation with respect to each other.

In the embodiment illustrated in Fig. 1, the housing unit B includes a head portion 20 which surrounds the combustion chamber head 10 in generally spaced relation with respect thereto, the head portion 20 is followed by the parts 12 and 14 previously mentioned, and the latter are in turn followed by a hollow generally cylindrical part 22 which surrounds the part 16 of the combustion chamber unit A in generally spaced relation with respect thereto. The lower end of the part 22 is provided with a cylindrical bore 24 and the nozzle portion 18 of the part 16 of the combustion chamber unit A is provided with an annular flange 28 which is relatively closely received in the bore 24 and therefore serves to center the nozzle portion 18 of the combustion chamber with respect to the lower end of the housing unit B. Additionally, an annular plate 30 is arranged in concentric relation with respect to the housing member 22 and in abutting relation with respect to the lower axial face thereof. The lower axial ends of both the combustion chamber part 16 and the housing part 22 are provided with concentric and adjacent axially extending pilot portions 32 and 34 respectively and the plate 30 is provided with a recess 36 in which these pilot portions are relatively closely received so as to further aid in holding the associated parts concentrically together. The plate member 30 is provided with a flared discharge opening 38 of greater diameter than the discharge end of the nozzle portion 18 of the combustion chamber part 16 so as to permit the gases to be ejected from the combustion chamber unit A therethrough.

The combustion chamber head 10 is provided with a flanged pilot part 40 integral therewith which projects up through and is closely received in a bore 42 provided in the housing portion 20 for reception thereof and externally of the housing 20 the pilot portion 40 is threaded and receives thereon a nut 44. Thus, the combustion chamber head portion 10 is accurately located with respect to the housing 20 and is rigidly fixed with respect thereto. In order to further aid in locating and fixing the combustion chamber head portion 10 to the housing portion 20, a plurality of bolts such as 46 may be projected through the sides of the housing portion 20 and threaded into suitable bosses 48 provided on the exterior surface of the combustion chamber head portion 10. Similar bolts 50 may be projected transversely through the sides of the housing portion 22 and similarly threaded into bosses 52 on the exterior wall of the combustion chamber member 16 to maintain it in centralized position with respect to the housing part 22. Bolts 54 may be passed up through the plate 30 and threaded into the lower end of the housing portion 22 in order to hold the plate 30 in position and fix the combustion chamber portion 16 axially in one direction with respect to the housing portion 22 and the cooperating parts.

From the foregoing, it will be appreciated that the housing parts 20 and 22 being arranged in spaced relation with respect to the combustion chamber unit A, a closed chamber C is provided between the parts 10 and 20 on one side of the members 12 and 14 and a second chamber C' is provided between the parts 16 and 22 on the other side of the members 12 and 14. These chambers C and C' form a part of the passage through which the combustion supporting media for the fuel is fed to the interior of the combustion chamber unit A.

The parts 12 and 14 are annular parts having stepped cooperating faces which interfit with one another to maintain their concentricity and in the particular construction shown serve to space the housing portions 20 and 22 from each other. Their axially outer faces are also stepped and the cooperating faces of the housing portions 20 and 22 are complementarily stepped so as to aid in maintainng the concentricity between them and these parts. The parts 12 and 14 are centrally apertured concentrically with and to a diameter to correspond with the diameter of that portion of the combustion chamber A in which their inner edges are exposed so as to cooperate with the portions 10 and 16 of the combustion chamber to form a smooth interior wall. The radially inner edges of the parts 12 and 14 are tapered and the complementary walls of the combustion chamber portions 10 and 16 are complementarily tapered but are spaced therefrom so as to provide circular inlet ports 60 and 62 respectively.

The opposed faces of the parts 12 and 14 between the radial inner and outer margins thereof are annularly grooved and cooperate to form an annular distribution passage 64 between them. Radially inwardly of the passage 64, the opposed faces of the parts 12 and 14 are relieved so as to space them from one another, thus to form a third circular port 66 opening into the interior of the combustion chamber A. A passage 68 is provided in the part 14 and which leads from the outer periphery thereof to the distribution passage 64 and is connected by a conduit 70 to a suitable source of fuel.

The housing portion 22 is provided with a passage 72 extending radially therethrough and the housing portion 20 is provided with a similar passage 73 extending through a boss 74 provided therefor. These passages are connected to branches 76 and 78 of a conduit 80 leading to a suitable source of media for supporting combustion of the fuel within the combustion chamber A and therefore serve to provide means for leading such media into the chambers C and C'.

Any suitable fuel and any suitable combustion sustaining media therefor may be employed in accordance with the present invention but the combustion sustaining media for the fuel is preferably a liquified gas so as to permit utilization of its latent heat of vaporization for cooling the combustion chamber forming ports. For the purpose of illustration it may be assumed that the fuel is any suitable liquid hydrocarbon such as gasoline, fuel oil, or the like, and the combustion supporting media for the same is oxygen and which is preferably introduced into the chambers C and C' in liquid form.

It will be appreciated that fuel which is introduced through the passage 68 into the distribution chamber 64 will flow radially inwardly through the port 66 between the parts 12 and 14 and will be introduced into the combustion chamber A in a radially inwardly direction and in the form of a thin sheet. Likewise, the oxygen which is introduced into the chambers C and C' will flow through the ports 60 and 62, respectively, in a generally radial direction on either side of the fuel introduced through the port 66 but inclined in a direction toward the fuel introduced through the port 66. The entering fuel is thus enveloped in a layer of oxygen as it is introduced into the combustion chamber A and within the combustion chamber the turbulent effects of the continued burning of the mixture therein will cause a thorough intermingling of the fuel and oxygen and substantially instantaneous combustion of the same. Any suitable or conventional ignition means (not shown) may, of course, be employed to initiate the combustion of the fuel and oxygen within the combustion chamber A.

It will be appreciated from the foregoing that with the above-described construction a simple and rugged means is provided for introducing the fuel and the combustion supporting media therefor into the combustion chamber and cause a desirable intermixture of the same for combustion purposes. In order to vary the relative proportions of fuel and combustion supporting media therefor, shims 90 are preferably provided between the housing portions 20 and 22 and the parts 12 and 14 respectively, such shims serving to vary the thickness of the ports 60 and 62 and therefore to vary the amount of combustion supporting media for the fuel that is introduced therethrough. Similar shims 92 are provided between the parts 12 and 14 to enable the thickness of the port 66 to be varied and thereby vary the volume of fuel supplied to the combustion chamber.

In the broader aspects of the invention, it makes no difference how the fuel and the oxygen are fed to the conduits 70 and 80. In the specific construction shown it is accomplished in the manner illustrated diagrammatically in Fig. 1, which is as follows. The conduit 70 leads to a pressure sealed tank 100 in which the supply of fuel is contained, and the conduit 80 leads to a tank 102 in which the supply of oxygen, preferably liquid oxygen, is contained. A third tank 104 is filled with some inert gas, such as nitrogen, under a relatively high pressure as, for illustration, 2000 pounds per square inch. The tank 104 is connected to the tanks 100 and 102 by a branch conduit 106 in which a pressure reducing valve 108 and regulating valve 110 are interposed in series. The reducing valve 108 is for the purpose of reducing the pressure of the inert gas from the tank 104 before delivering it to the tank 100 and 102. For instance, and as a matter of illustration, it may reduce the pressure delivered from the tank 104 to the tanks 100 and 102 to 500 pounds per square inch. The valve 110 may be a conventional pressure balancing valve adapted to maintain the pressure in the tanks 100 and 102 at the same or slightly different pressures. An inert gas such as nitrogen or the like is used in the tank 104 for the reason that it will not form an explosive mixture with the contents of either the tanks 100 or 102. Additionally, the tanks 100 and 102 are preferably interconnected by a conduit 112 in which a blowoff valve 114 is located so as to prevent the pressures in the tanks 100 and 102 from exceeding desirable operating pressures. Additionally, regulating valves 116 are preferably interposed in the conduits 70 and 80 in order to control the relative volume of flow of fluid through their corresponding conduits.

Where the combustion supporting media which is introduced to the chambers C and C' is liquid oxygen or other liquified gas capable of supporting combustion of the fuel, it will, of course, because of its extremely low temperature, serve to extract heat from the various parts of the device forming the combustion chamber A and will thus serve to cool these parts, and particularly when they are formed from heat resisting material to a temperature below their melting point so that they may continue to function in their intended manner during continued combustion within the combustion chamber A without destruction or without undue deleterious effects thereon. The heat which is thus transferred to the liquid oxygen within the chambers C and C' will, of course, cause an evaporation of such liquid oxygen but this gasified oxygen with or without some of the liquid oxygen will simply be fed into the combustion chamber through the ports 60 and 62 to support combustion of the fuel therein. Such evaporation serves to increase the absorption of heat from the combustion chamber forming parts and is therefore desirable.

From the foregoing, it will be appreciated that the rocket motor of the present invention is made up of a relatively few simple and easily machinable parts and that ample provision is made for utilizing the combustion supporting media for the fuel employed thereby for cooling those parts of the device forming the combustion chamber and preventing the temperature of these parts from reaching a destructive value, and that therefore the device is capable of operating with a continued combustion of the fuel therein, thus permitting maximum efficiency and power to be realized thereby.

It will be readily appreciated by those skilled in the art that a rocket motor may be constructed in accordance with the disclosure of Fig. 1 but arranged to provide a multiplicity of fuel inlet ports bounded on each side by combustion supporting media ports in the same general manner as illustrated in Fig. 1, so that a rocket motor of no greater diameter than that illustrated in Fig. 1 may be provided but capable of delivering a greater amount of power. As a matter of illustration, in Fig. 2 such a modification is shown and in which the rocket motor is provided with a pair of fuel inlet ports each bounded on each side thereof by a combustion supporting media port. The construction in Fig. 2 is identical to that in Fig. 1 except that the parts 12 and 14 are duplicated, each pair of parts 12 and 14 are spaced from one another by an additional part, and an additional part is provided for lengthening out the combustion chamber to conform. Accordingly, except for the additional parts utilized in the construction shown in Fig. 2, the same numerals as are employed in Fig. 1 to designate the same parts are employed here and a detailed description of the same will not be required to be repeated.

Referring now to Fig. 2, it will be noted that the same combustion chamber parts 10 and 16 are employed, the same housing parts 20 and 22 are employed but in this case two sets of parts 12 and 14, each identical to the corresponding parts previously described are provided here. The upper part 14 and the lower part 12 are in this case, however, spaced from each other by an annular member 120 and the radially inner ends of the two sets of fuel nozzle parts 12 and 14 have an additional annular combustion chamber part 122 interposed between them, the part 122 being spaced from the upper member 14 and from the lower member 12 to provide ports 62 and 60 respectively, corresponding with the similarly numbered ports of the first construction, between them. The part 122 is located and maintained in position by means of bolts 124 which extend radially through the part 120 and thread into the part 122 as shown. Combustion supporting media is introduced to the annular space between the parts 120 and 122 by means of a preferably radial passage such as indicated by dotted lines at 126. Otherwise the construction is identical to that shown in Fig. 1. It will be appreciated that with the construction illustrated in Fig. 2, twice as much fuel and combustion supporting media for the same is fed into the combustion chamber as in the first described construction and that therefore the motor in this case will be twice as powerful as in the first case. Obviously, as many additional units such as shown in Fig. 2, over that shown in Fig. 1, may be added as is desired or required to obtain a motor of the desired power.

Having thus described my invention, what I claim by Letters Patent is:

1. A rocket motor comprising, in combination, a combustion chamber unit and a housing unit arranged in surrounding and generally spaced and sealed relation with respect thereto, said combustion chamber unit comprising a pair of hollow parts arranged in end-to-end and spaced relationship and open to each other at their opposed ends, said housing unit comprising a pair of hollow members arranged in end-to-end relationship, a pair of additional members each having a central opening therein arranged in end-to-end relationship and interposed between the first-mentioned members and projecting between said parts and forming ports between them and said parts leading from the space between said combustion chamber unit and said housing unit into the interior of said combustion chamber unit, and the radially inward portions of said parts being spaced from one another whereby to form a port positioned between the first-mentioned ports and leading into the interior of said combustion chamber unit.

2. A rocket motor comprising, in combination, a combustion chamber unit and a housing unit arranged in surrounding and generally spaced and sealed relation with respect thereto, said combustion chamber unit comprising a pair of hollow parts arranged in end-to-end and spaced relationship and open to each other at their opposed ends, said housing unit comprising a pair of hollow members arranged in end-to-end relationship, a pair of additional members each having a central opening therein arranged in end-to-end relationship and interposed between the first-mentioned members and projecting between said parts and forming ports between them and said parts leading from the space between said combustion chamber unit and said housing unit into the interior of said combustion chamber unit, the radially inward portions of said parts being spaced from one another whereby to form a port positioned between the first-mentioned ports and leading into the interior of said combustion chamber unit, means for introducing fuel into the interior of said combustion chamber unit through the last-mentioned port, means for introducing combustion supporting media for such fuel into the space between said units for delivering the same into the interior of said combustion chamber unit through the two first-mentioned ports, and the radially inner margins of said two last-mentioned members being arranged in converging relationship toward the axis of said combustion chamber unit and the opposed walls of said parts being complementarily inclined whereby said combustion supporting media for said fuel introduced through the two first-mentioned ports are directed into intimate contact with fuel introduced through the last-mentioned said port.

3. A rocket motor comprising, in combination, a combustion chamber unit and a housing unit arranged in surrounding and generally spaced and sealed relation with respect thereto, said combustion chamber unit comprising a pair of hollow parts arranged in end-to-end and spaced relationship and open to each other at their opposed ends, said housing unit comprising a pair of hollow members arranged in end-to-end relationship, a pair of additional members each having a central opening therein arranged in end-to-end relationship and interposed between the first-mentioned members and projecting between said parts and forming ports between them and said parts leading from the space between said combustion chamber unit and said housing unit into the interior of said combustion chamber unit, and the last-mentioned parts having cooperating grooves in their opposed faces forming an annular passage between them and being spaced from each other radially inwardly of said passage whereby to form a part connecting said passage with the interior of said combustion chamber unit.

4. A rocket motor comprising, in combination, a combustion chamber unit and a housing unit arranged in surrounding and generally spaced and sealed relation with respect thereto, said combustion chamber unit comprising a pair of hollow parts arranged in end-to-end and spaced relationship and open to each other at their opposed ends, said housing unit comprising a pair of hollow members arranged in end-to-end relationship, a pair of additional members each having a central opening therein arranged in end-to-end and contacting relationship spacing the first-mentioned members and projecting between said parts and forming ports between them and said parts leading from the space between said combustion chamber unit and said housing unit into the interior of said combustion chamber unit, and the radially inward portions of said parts being spaced from one another whereby to form a port positioned between the first-mentioned ports and leading into the interior of said combustion chamber unit.

5. A rocket motor comprising, in combination, a combustion chamber unit and a housing unit arranged in surrounding and generally spaced and sealed relation with respect thereto, said combustion chamber unit comprising a pair of hollow parts arranged in end-to-end and spaced relationship and open to each other at their opposed ends, said housing unit comprising a pair of hollow members arranged in end-to-end relationship, a pair of additional members each having a central opening therein arranged in end-to-end and contacting relationship spacing the first-mentioned members and projecting between said parts and forming ports between them and said parts leading from the space between said combustion chamber unit and said housing unit into the interior of said combustion chamber unit, the last-mentioned parts having cooperating grooves in their opposed faces forming an annular passage therebetween and being spaced from each other radially inwardly of said passage whereby to form a port connecting said passages with the interior of said combustion chamber unit, means for delivering fuel to said passage, and means for delivering a combustion sustaining media for said fuel to the space between said units.

6. A rocket motor comprising, in combination, a combustion chamber unit and a housing unit arranged in surrounding and generally spaced and sealed relation with respect thereto, said combustion chamber unit comprising a pair of hollow parts arranged in end-to-end and spaced relationship and open to each other at their opposed ends, said housing unit comprising a pair of hollow members arranged in end-to-end relationship, a pair of additional members each having a central opening therein arranged in end-to-end and contacting relationship interposed between the opposed ends of the first-mentioned members, shims cooperating between said second-mentioned members and said first-mentioned members to space said first-mentioned members at a desired distance between them and at a desired distance from said second mentioned members, said second-mentioned members projecting between said parts and forming ports between them and said parts leading from the space between said combustion chamber unit and said housing unit into the interior of said combustion chamber unit, the last-mentioned parts being spaced from each other at their radially inner margins to form an additional port located between the two first-mentioned ports and opening into the interior of said combustion chamber unit.

7. A rocket motor comprising, in combination, a combustion chamber unit and a housing unit arranged in surrounding and generally spaced and sealed relation with respect thereto, said combustion chamber unit comprising a pair of hollow parts arranged in end-to-end and spaced relationship and open to each other at their opposed ends, said housing unit comprising a pair of hollow members arranged in end-to-end relationship, a pair of additional members each having a central opening therein arranged in end-to-end and contacting relationship interposed between the first-mentioned members and projecting between said parts and forming ports between them and said parts leading from the space between said combustion chamber unit and said housing unit into the interior of said combustion chamber unit, the last-mentioned parts being spaced from one another at their radially inner margins whereby to form an additional port opening into said combustion chamber unit, and shims interposed between said last-mentioned part for controlling the width of said last-mentioned port.

8. A rocket motor comprising, in combination, a combustion chamber unit and a housing unit arranged in surrounding and generally spaced and sealed relation with respect thereto, said combustion chamber unit comprising a pair of hollow parts arranged in end-to-end and spaced relationship and open to each other at their opposed ends, the opposite ends of one of said parts being closed and the opposite ends of the other of said parts being open, said housing unit comprising a pair of hollow members arranged in end-to-end relationship, a pair of additional members each having a central opening therein arranged in end-to-end relationship and interposed between the first-mentioned pair of members and projecting between said parts and forming ports between them and said parts connecting the space between said combustion chamber unit and said housing unit with the interior of said combustion chamber unit, means spacing the radially inner edges of marginal edges of the last-mentioned pair of parts whereby to form a fuel port leading into the interior of said combustion chamber unit, a stud formed integrally with the closed end of said one of said parts projecting through and closely received by one of the first-mentioned of said pair of members for locating said one of said parts with respect thereto, the opposite end of said other of said parts being closely but slidably received by the corresponding end of the other of said first-mentioned pair of members, and means cooperating with said other of said parts and said one of said first-mentioned pair of members for locating the former axially with respect to the latter.

9. A rocket motor comprising, in combination, a combustion chamber unit and a housing unit arranged in surrounding and generally spaced and sealed relation with respect thereto, said combustion chamber unit comprising a pair of hollow parts arranged in end-to-end and spaced relationship and open to each other at their opposed ends, the opposite ends of one of said parts being closed and the opposite ends of the other of said parts being open, said housing unit comprising a pair of hollow members arranged in end-to-end relationship, a pair of additional members each having a central opening therein arranged in end-to-end relationship and interposed between the first-mentioned pair of members and projecting between said parts and forming ports between them and said parts connecting the space between said combustion chamber unit and said housing unit with the interior of said combustion chamber unit, means spacing the radially inner edges of marginal edges of the last-mentioned pair of parts whereby to form a fuel port leading into the interior of said combustion chamber unit, a stud formed integrally with the closed end of said one of said parts projecting through and closely received by one of the first-mentioned of said pair of members for locating said one of said parts with respect thereto, the opposite end of said other of said parts being closely but slidably received by the corresponding end of the other of said first-mentioned pair of members, means cooperating with said other of said parts and said one of said first-mentioned pair of members for locating the former axially with respect to the latter, and screw means projecting laterally through the walls of said first-mentioned pair of members and engaging said parts for further anchoring said parts with respect to said first-mentioned pair of members.

10. A rocket motor comprising, in combination, a combustion chamber unit and a housing unit arranged in surrounding and generally spaced and sealed relation with respect thereto, said combustion chamber unit comprising a plurality of hollow parts arranged in end-to-end and spaced relationship, said housing unit comprising a plurality of hollow members arranged in end-to-end relationship and with the opposed ends of adjacent parts transversely aligned with the space between the opposed ends of adjacent of said parts, a pair of additional members each having a central opening therein arranged in end-to-end relationship interposed between each adjacent pair of the first-mentioned members and projecting between the opposed ends of the corresponding of said parts and forming ports between them and said corresponding of parts leading to the interior of said combustion chamber unit, and each pair of said last-mentioned members being spaced from one another at their radially inner margins whereby to form an additional port leading into the interior of said combustion chamber unit between such inner margins.

ANDREW L. BOWMAN.